US005497748A

United States Patent [19]

Ott et al.

[11] Patent Number: 5,497,748

[45] Date of Patent: Mar. 12, 1996

[54] DEVICE FOR RECOGNISING THE ANGULAR POSITION OF A ROTATING PART

[75] Inventors: Karl Ott, Markgroeningen; Erwin Schmuck, Waiblingen; Immanuel Krauter, Erbstetten; Joerg Fuchs, Schwieberdingen, all of Germany

[73] Assignee: Robert Bosch GmbH, Stuttgart, Germany

[21] Appl. No.: 211,729

[22] PCT Filed: Sep. 19, 1992

[86] PCT No.: PCT/DE92/00805

§ 371 Date: Apr. 11, 1994

§ 102(e) Date: Apr. 11, 1994

[87] PCT Pub. No.: WO93/07449

PCT Pub. Date: Apr. 15, 1993

[30] Foreign Application Priority Data

Oct. 10, 1991 [DE] Germany .......................... 41 33 570.8

[51] Int. Cl.$^6$ .............................. F02P 7/06; F02D 41/00; G01D 5/249

[52] U.S. Cl. .............................................. 123/414; 73/116

[58] Field of Search .................................... 123/414, 617, 123/643; 73/116

[56] References Cited

U.S. PATENT DOCUMENTS

| | | | |
|---|---|---|---|
| Re. 34,183 | 2/1993 | Wilens et al. | 123/414 |
| 4,152,655 | 5/1979 | Przybyla et al. | 327/20 |
| 4,321,580 | 3/1982 | Deleris | 340/870.24 |
| 4,338,903 | 7/1982 | Bolinger | 123/414 X |
| 4,459,968 | 7/1984 | Brandt et al. | 123/643 |
| 4,528,471 | 7/1985 | Baumann | 310/111 |
| 4,553,426 | 11/1985 | Capurka | 123/414 X |
| 4,553,427 | 11/1985 | Kuraoka et al. | 123/414 X |
| 4,742,332 | 5/1988 | Schroeder et al. | 341/15 |
| 4,797,827 | 1/1989 | Cockerham | 123/414 X |
| 4,899,281 | 2/1990 | Grimaud et al. | 123/417 X |

FOREIGN PATENT DOCUMENTS 0188433 6/1989 European Pat. Off. .

*Primary Examiner*—Tony M. Argenbright
*Attorney, Agent, or Firm*—Michael J. Striker

[57] ABSTRACT

A device for recognizing the angular position of a rotating part is described in which the rotating part is a pick-up disc (14) provided with a multiplicity of regular angle marks (11) and a distinguishable reference mark (12), which is formed, for example, by two missing angle marks (11). The number of angle marks is (n–2), where n is a number which is divisible by as many numbers as possible corresponding to different numbers of cylinders and, for example, is 36. The voltage sequence generated in the sensor (15) is analyzed in the control unit (19), unambiguous cylinder recognition being obtained after the recognition of the reference mark (12) by comparison with a camshaft signal. The analysis of the voltage sequence also supplies the rotational speed and flanks, which can be predetermined, of the pulse sequence used for ignition and/or injection control.

8 Claims, 1 Drawing Sheet

DEVICE FOR RECOGNISING THE ANGULAR POSITION OF A ROTATING PART

STATE OF THE ART

The invention is based on a device for recognising the angular position of a rotating part. Such a device is used, in particular, for rotational speed and angular information for control units in internal combustion engines, in particular ignition and fuel injection controls, in which both the rotational speed and the angular information can be recorded by means of a single pick-up. The points in time required for the ignition and/or injection are calculated from the angular information.

Appliances for recording the angular position of a rotating part are already known. Such an appliance is described, for example, in EP 0 188 433, in which a pick-up scans a pick-up disc which is connected to the crankshaft or camshaft of an internal combustion engine and which has evenly distributed, tooth-shaped angle marks on its periphery. In addition to the angle marks, there is also a reference mark which can, for example, be configured as a missing tooth, a larger gap between two teeth or a half-tooth on the rotating part.

The pick-up, which is configured as an inductive perception head, supplies a signal which is formed into a rectangular signal in a processing circuit and is analysed in a subsequent microcomputer. The recognition of the reference mark takes place by means of sequentially occurring time comparisons, the recognition then taking place when a short time is followed by a longer time, and this again is followed by a shorter time.

The known appliance has the disadvantage that a multiplicity of teeth, for example 180, are provided, the determination of the number of teeth being optimised in such a way that the time intervals between similar angle mark flanks can still be rationally analysed.

Another appliance for recording the angular position of a rotating part is known from EP 00 13 846. In this, a pick-up disc is used which has 32-2 markings on its surface, the two missing markings again being used as the reference mark. This pick-up disc has the disadvantage that the number of markings permits no fixed reference to the position of the individual cylinders if the number of cylinders is 3, 6 or 12. For this reason, the known pick-up disc cannot be universally employed.

ADVANTAGES OF THE INVENTION

The device according to the invention has, in contrast, the advantage over known appliances or devices that the special number of markings or teeth on the pick-up disc permits a fixed relationship between the marking and the position of the individual cylinders for all usual numbers of cylinders and, therefore, permits simple analysis. This is possible because 36 can be divided by 2, 3, 4, 6 and also 12. In the case of 8-cylinder engines, two cylinder banks are formed and the allocation therefore corresponds to that of the 4-cylinder engine.

Advantageous embodiments of the pick-up disc are given which permit a particularly simple analysis.

BRIEF DESCRIPTION OF THE DRAWINGS

An embodiment example of the invention is shown in the drawing and is explained in more detail in the following description.

DESCRIPTION OF THE EMBODIMENT EXAMPLE

Figure 1:
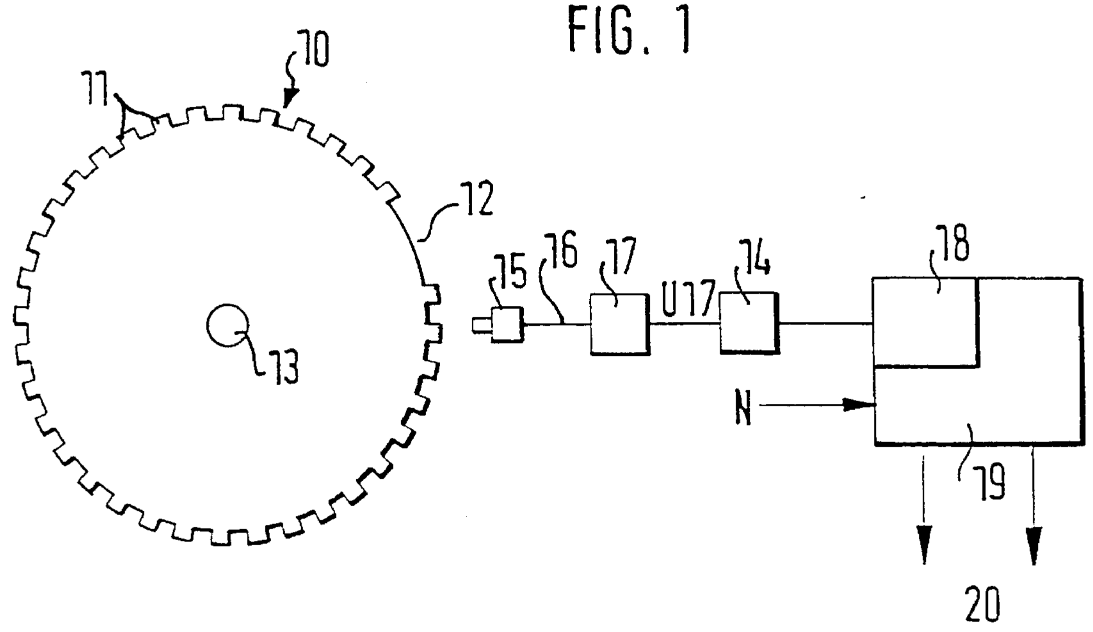
FIG. 1 shows the fundamental structure of the pick-up system including a subsequent analysis circuit.

In the embodiment example shown in FIG. 1, a pick-up disc 10 is illustrated which has a multiplicity of angle marks 11, which are configured as rectangular teeth, on its surface. Furthermore, the pick-up disc 10 has a reference mark gap 12 which consists of two missing angle marks.

In the embodiment example, the number n of angle marks is 36-2; this number n permits particularly simple analysis possibilities.

The pick-up disc 10 is connected to the crankshaft 13 of an internal combustion engine; it is also possible to configure the toothed belt pulley appropriately and to use it as the pick-up disc.

The pick-up disc 10 is scanned by means of a sensor 15, for example an inductive sensor or a Hall sensor, which is connected to an analysis circuit 17 by means of a conductor 16. Signal amplification and signal preparation takes place in the analysis circuit 17 so that the further analysis can take place, after an analog/digital conversion in the analog/digital converter 14, in a microcomputer 18; it is possible for the signal analysis and the signal processing to take place in the microcomputer in such a way as is, for example, described in EP 0 188 433.

The analysis circuit 17 and the microcomputer 18 are usually a constituent part of the control unit 19 but they can also be constructed separately; the analysis circuit 17 can also be omitted if the complete signal processing takes place in the control unit 19 itself after an analog/digital conversion.

Figure 2:
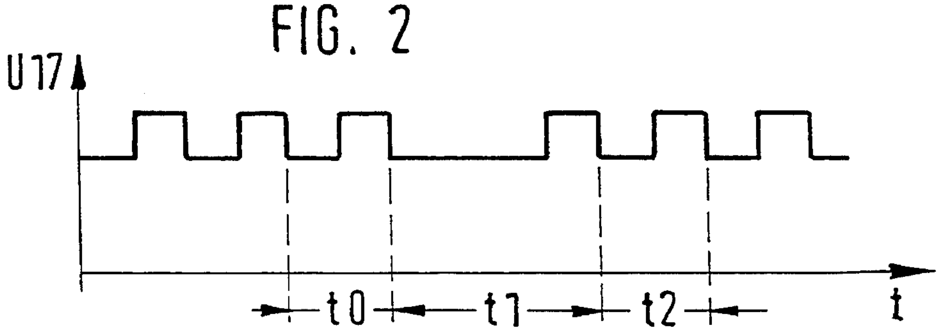
FIG. 2 shows the variation of the voltage with time.

When the angle marks 11 pass the sensor 15, an alternating voltage whose frequency depends on the rotational speed of the pick-up disc is generated in the sensor. After processing in the analysis circuit 17, a rectangular voltage $U_{17}$ is obtained from this alternating voltage, as is shown in FIG. 2. This voltage is plotted as a function of time t.

The rectangular voltage U17 reproduces the sequence of the individual markings; as long as the reference mark, which corresponds to two missing markings, is passing the sensor, no voltage is induced in the latter either.

The analysis of the rectangular voltage takes place in the microcomputer 18 or in the control unit 19. In this analysis, the distances between the individual voltage pulses are determined; this can, for example, take place in accordance with the method described in EP 0 188 433, in which the time differences between similar angle mark flanks are measured. It is also possible to analyze the time between the front and the rear flanks of the individual markings. Furthermore a combination is also conceivable in which the rotational speed is determined from the time between the front and rear flank of one and the same mark, this rotational speed being, in known manner, inversely proportional to the time whereas, for recognition of the reference mark, the respective front flanks or the respective rear flanks of the individual pulses are analysed, i.e. the times between them are determined.

The reference mark is recognised particularly reliably if several time differences between similar angle mark flanks are analysed—if, therefore, a reference mark is recognised when a first time t0 is clearly smaller than a second time t1 and the latter is clearly larger than a third time t2.

After the reference mark 12 has been recognised, the position of the crankshaft can be determined from it in the control unit 19 because there is a fixed relationship between the reference mark and the crankshaft position.

In order to make unambiguous cylinder recognition possible, a camshaft signal N of a camshaft sensor is additionally supplied to the microcomputer 18 or the control unit 19, which signal consists, for example, of one pulse per camshaft revolution. The association between the camshaft signal and the reference mark recognised then permits unambiguous cylinder recognition, of the top dead centre position of the first cylinder, for example, and, therefore, for a fixed cylinder sequence, of the other cylinders also. The calculations necessary for this purpose take place in the microcomputer 18 or control unit 19 and the latter initiates the usual closed-loop and open-loop control procedures via outputs 20.

The top dead centre position for each individual cylinder can be calculated from this by counting the individual voltage pulses. In the case of a two-cylinder engine, the second cylinder is at the top dead centre position after 18 voltage pulses. In the case of a four-cylinder engine, the second cylinder is in the top dead centre position after 9 voltage pulses, the third cylinder after 18 voltage pulses and the fourth cylinder after 27 voltage pulses and the first cylinder is in the top dead centre position again after 36-2 voltage pulses. This simple association between reference mark and position of the individual cylinders is possible because the use of (n–2)=36-2 teeth and the fact that n=36 can be divided without remainder by 2, 4, 6 and 12 provide simple counting for the individual cylinder positions.

The pick-up disc illustrated in FIG. 1 can also be modified by selecting a different number of markings or teeth. It should be noted that this number n must be divisible by 2, 3, 4, 5, 6 and 12; in addition to 36-2, 60-2 or 120-2 markings would also be advantageous because such numbers of markings also permit simple analysis.

Given a suitable distribution of the n markings around the periphery of the pick-up disc 10, the length of the reference mark gap does not necessarily have to correspond to two missing markings but can, in general, correspond to a length of m markings.

A pick-up disc with 36-2 teeth is, however, particularly favourable for a disc diameter of 70 mm and a disc thickness of approximately 4 mm.

The height and width of the markings and the intermediate space between the individual markings can be designed otherwise. As an example, the length of the markings can be equal to the length of the individual intermediate spaces or the intermediate spaces can be twice as long as the markings. The way in which the individual distances are determined depends on the respective requirements; it is particularly important that the design of the teeth or of the intermediate spaces should give an optimum distribution of the voltage induced in the sensor 15.

Figure 1A:
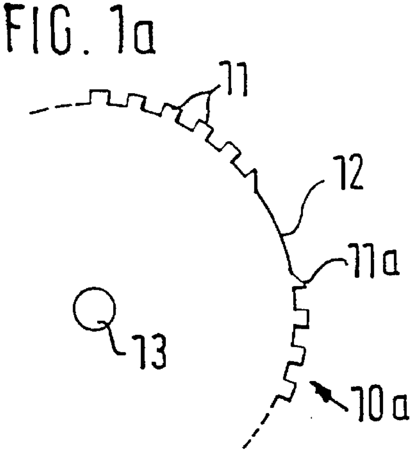
FIGS. 1*a* and 1*b* show possible embodiments of the pick-up disc.

A ferromagnetic disc is usually selected as the pick-up disc 10 but it is also possible to employ a disc in another material and to manufacture only the markings or teeth in ferromagnetic material. In the embodiment example, the sensor 15 is an inductive sensor; it would also be possible to use a Hall sensor instead. So that a voltage is induced in the sensor 15 which is as easy as possible to analyse, it can be necessary to employ a different pick-up disc 10*a*, the angle mark preceding the reference mark 12 and/or the subsequent angle mark 11*a* being chamfered on the side directed towards the reference mark, as is illustrated in FIG. 1*a*.

Figure 1B:
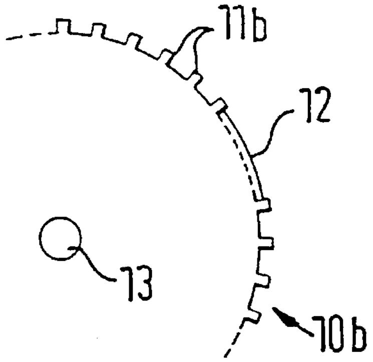

A further possibility is indicated in FIG. 1*b*, with similar angle marks 11*b* which are substantially shorter than the intermediate spaces between the marks and a reference mark 12, whose depth is less than that of the intermediate space between the similar angle marks. Combinations of the proposals of FIGS. 1, 1*a*, 1*b* are also possible.

We claim:

1. A device for recognizing an angular position of a rotating part of an internal combustion engine, comprising a rotating element connectable with crankshaft of an internal combustion engine for joint rotation therewith and provided with a plurality of angle marks substantially uniformly distributed around a periphery of said rotating element and also with at least one reference mark; a sensor scanning said angle marks during a rotation of said rotating element together with the crankshaft and producing output signals dependent on said scanned angle marks; and evaluating means receiving said output signals of said sensor and also receiving a signal from a camshaft of the internal combustion engine so as to provide time measurements for recognition of said reference mark and to evaluate a time sequence of said output signals, said evaluating control means being formed so that it provides counting procedures after the recognition of said reference mark, analyzes flanks of voltage pulses, and draws conclusions on a position of individual cylinders from a number of voltage pulses counted the number of said angle marks being n minus m wherein n is equal to 36 and m is equal to 2.

2. A device as defined in claim 1, wherein said reference mark is formed as a lengthened intermediate space between two neighboring ones of said angle marks and extends over a length of two of said angle marks and three intermediate spaces therebetween.

3. A device as defined in claim 3, wherein said angle marks are spaced from one another by gaps having a predetermined depth, said reference mark having a smaller depth than said depth of said gaps.

4. A device as defined in claim 3, wherein said reference marks are half as deep as said gaps between said angle marks.

5. A method of recognizing an angular position of a rotating part of an internal combustion engine, comprising the steps of connecting a rotating element with a crankshaft of an internal combustion engine for joint rotation therewith and providing on the rotating element a plurality of angle marks uniformly distributed around its periphery and at least one reference mark; scanning the angle marks by a sensor during rotation of said rotating element together with the crankshaft and producing output signals in dependence on the scanned angle marks; receiving by evaluating means a camshaft signal and providing time measurements for recognizing the reference mark; evaluating by evaluating means a time sequence of the output signals of said sensor; performing in the evaluating means counting procedures after the recognition of the reference mark, an analysis of flanks of voltage pulses and conclusions on a position of individual cylinders of the internal combustion engine from a number of the voltage pulses counted; and selecting the number of angle marks equal to n minus m wherein n is equal to 36 and m is equal to 2.

6. A method as defined in claim 5, wherein said providing includes forming the reference mark as a lengthened intermediate space between two said angle marks so that the reference marks extends over a length of two of said angle marks and three intermediate spaces therebetween.

7. A method as defined in claim 6, wherein said providing includes providing the reference mark which is less deep than gaps between said angle marks.

8. A method as defined in claim 7, wherein said providing includes forming the reference mark half as deep as gaps between the angle marks.

* * * * *